(12) United States Patent
Cho

(10) Patent No.: US 6,927,832 B2
(45) Date of Patent: Aug. 9, 2005

(54) LIQUID CRYSTAL DISPLAY DEVICE AND METHOD OF MANUFACTURING THE SAME

(75) Inventor: Min Gu Cho, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 269 days.

(21) Appl. No.: 10/219,007

(22) Filed: Aug. 15, 2002

(65) Prior Publication Data

US 2003/0095226 A1 May 22, 2003

(30) Foreign Application Priority Data

Nov. 22, 2001 (KR) .......................................... 2001-73002

(51) Int. Cl.$^7$ ............................................. G02F 1/1345
(52) U.S. Cl. ......................... 349/150; 349/43; 349/138
(58) Field of Search ............................ 349/150, 42, 43, 349/138, 152; 257/59, 72

(56) References Cited

U.S. PATENT DOCUMENTS

| | | | | |
|---|---|---|---|---|
| 5,412,493 A | * | 5/1995 | Kunii et al. ................... | 349/43 |
| 5,608,557 A | * | 3/1997 | Wu .............................. | 349/42 |
| 5,703,382 A | * | 12/1997 | Hack et al. .................... | 257/72 |
| 5,710,606 A | * | 1/1998 | Nakajima et al. ............. | 349/42 |
| 5,777,702 A | * | 7/1998 | Wakagi et al. ................ | 349/47 |
| 6,262,784 B1 | * | 7/2001 | Kim ............................. | 349/43 |

* cited by examiner

Primary Examiner—Thien M. Le
Assistant Examiner—Edwyn Labaze
(74) Attorney, Agent, or Firm—Morgan, Lewis & Bockius LLP

(57) ABSTRACT

A liquid crystal display device includes a first substrate, a second substrate opposed to the first substrate, a plurality of gate lines formed on the first substrate along a first direction, a plurality of data lines formed on the first substrate along a second direction perpendicular to the first direction to define a plurality of pixel regions at intersections of the gate and data lines, a plurality of gate pads, each of the gate pads formed at an end portion of a corresponding one of the plurality of gate lines, a plurality of data pads, each of the data pads formed at an end portion of a corresponding one of the plurality of data lines, a gate insulating film having a first density formed on an entire surface of the first substrate including the plurality of gate lines and the plurality of gate pads, a plurality of thin film transistors formed at each intersection of the gate and data lines and between respective gate lines and respective data lines, and a passivation film having a second density less than the first density formed on an entire surface of the first substrate including the plurality of thin film transistors, the plurality of data lines, and the plurality of data pads.

18 Claims, 8 Drawing Sheets

FIG.6B
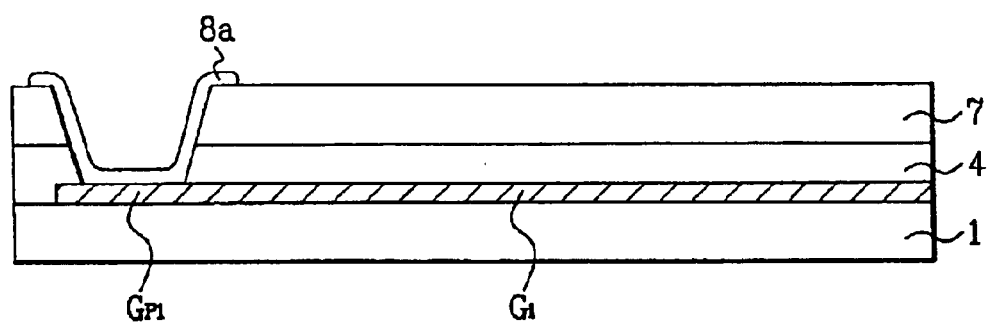
FIG.7A FIG.7B
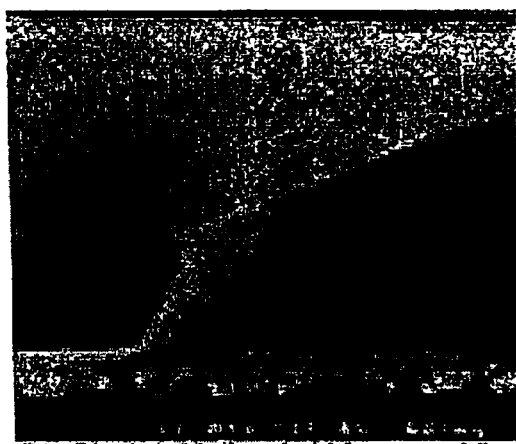 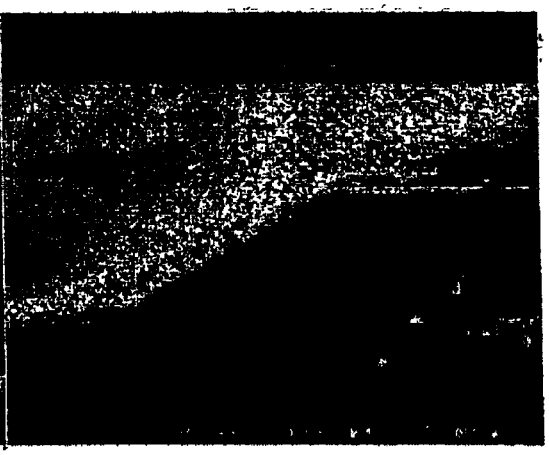

LIQUID CRYSTAL DISPLAY DEVICE AND METHOD OF MANUFACTURING THE SAME

The present invention claims the benefit of the Korean Patent Application No. P2001-73002 filed in Korea on Nov. 22, 2001, which is hereby incorporated by reference.

BACKGROUND OF THE INVENTION

1. Field of the Invention

The present invention relates to a display device, and more particularly, to a liquid crystal display (LCD) device and a method of manufacturing an LCD device.

2. Discussion of the Related Art

In general, cathode ray tubes (CRTs) have been commonly used as display devices in televisions and computer monitors because of their ability to display various colors with high luminance. However, CRTs are relatively large and cannot adequately satisfy present demands for display applications that require reduced weight, portability, low power consumption, and increased screen size and resolution. Accordingly, flat panel displays have been developed for use as monitors for computers, spacecraft, and aircraft.

One type of flat panel display that has been developed is the liquid crystal display (LCD) device. The LCD device commonly includes a first substrate, a second substrate, and a liquid crystal sealed between the first and second substrate.

FIG. 1 is a plan view of a first substrate of an LCD device according to the related art. In FIG. 1, a first substrate 1 is divided into an active region A and a pad region P. Within the active region A, a plurality of gate lines $G_1, G_2, \ldots, G_n$ are arranged to cross a plurality of data lines $D_1, D_2, \ldots, D_n$ so that a plurality of pixel regions are defined. A pixel electrode 8 is formed in each pixel region, and a thin film transistor (TFT) (not shown) is formed at each crossing point between the respective gate and data lines. Within the pad region P, a plurality of gate pads $G_{p1}, G_{p2}, \ldots, G_{pn}$ and a plurality of data pads $D_{p1}, D_{p2}, \ldots, D_{pn}$ are arranged. The gate pads $G_{p1}, G_{p2}, \ldots, G_{pn}$ transmit gate signals output from a gate driving IC (not shown) to the gate lines $G_1, G_2, \ldots, G_n$. The data pads $D_{p1}, D_{p2}, \ldots, D_{pn}$ transmit data signals output from a data driving IC (not shown) to the data lines $D_1, D_2, \ldots, D_n$.

FIG. 2 is a cross sectional view of the LCD device according to the related art taken along I–I' of FIG. 1. In FIG. 2, the LCD includes a first substrate 1 and a second substrate 2 that are mutually attached to each other to form a single body. A gate electrode 3 is formed on the first substrate 1, and a gate insulating film 4 is formed on an entire surface of the first substrate 1 including the gate electrode 3. A semiconductor layer 5 is formed on a portion of the gate insulating film 4 that corresponds to the gate electrode 3. Source and drain electrodes 6a and 6b are formed at both sides on the semiconductor layer 5. Accordingly, the gate electrode 3, the semiconductor layer 5, and the source/drain electrodes 6a and 6b constitute a TFT. A passivation film 7 is formed on an entire surface of the first substrate 1 including the TFT. A pixel electrode 8, which is connected to the drain electrode 6b, is formed on the passivation film 7, and an alignment film 9a for regular alignment of a liquid crystal is formed on an entire surface of the substrate including the pixel electrode 8

A light-shielding layer 10 is formed on the second substrate 2 to shield any light that leaks from the gate and data lines and the TFT. A color filter layer 11 is formed to oppose the pixel electrode 8 formed on the first substrate 1, and a common electrode 13 made of a transparent material is formed on the color filter layer 11 and the light-shielding layer 10. An alignment film 9b is formed on the common electrode 13, and an overcoat layer 12 may further be formed on the light-shielding layer 10 and the color filter layer 11 to planarize the second substrate 2.

A liquid crystal material layer 15, a spacer 14, and a sealant 16 are formed between the first substrate 1 and the second substrate 2. The liquid crystal material layer 15 possesses an alignment characteristic due to the alignment films 9a and 9b. The spacer is formed of a plastic material and provides a space between opposing surfaces of the first and second substrates 1 and 2. The sealant 16 attaches the first and second substrates 1 and 2 to each other, and seals an outer portion of the active region A to prevent humidity or other substances from entering into the liquid crystal material layer 15. In addition, a driving circuit (not shown) for driving the TFT is connected to the first substrate 1 by a tape carrier package (not shown).

The pad region P of the aforementioned related art LCD will be described in more detail with reference to FIG. 3.

FIG. 3 is a cross sectional view of the LCD device according to the related art taken along II–II' of FIG. 1. In FIG. 3, a gate pad Gp1 extends from a gate line G1 formed at a pad region on the first substrate 1. A gate insulating film 4 is formed on the gate pad Gp1, the gate line G1, and over an entire surface of the first substrate 1, and a passivation film 7 is formed on the gate insulating film 4 and over an entire surface of the first substrate 1. Then, a contact hole is formed to pass through the passivation film 7 and the gate insulating film 4. A transparent conductive film 8a formed of indium tin oxide (ITO) is formed to electrically interconnect the gate pad Gp1 with a driving circuit (not shown) via the contact hole. The gate pad Gp1 is formed of an opaque metal such as Al, Cr, Mo, Cu, Al alloy, or a multiple layer structure thereof, and the gate insulating film 4 and the passivation film 7 are formed of $SiN_x$.

The gate insulating film 4 and the passivation film 7 are formed by a plasma chemical vapor deposition (CVD) method using a mixed gas of $SiH_4$ and $NH_3$. The contact hole of the gate insulating film 4 and the passivation film 7 are formed by an etching process to connect the gate pad Gp1 with the driving circuit.

FIGS. 4A and 4B show cross sectional views of a gate pad according to the related art during a portion of a manufacturing process.

FIG. 4A is a cross sectional view of a gate pad according to the related art taken along II–II' of FIG. 1 after a gate insulating film and a passivation film are etched. In FIG. 4A, the gate insulating film 4 and the passivation film 7 are formed on the gate pad Gp1, and then a contact hole is etched.

FIG. 4B is a cross sectional view of a gate pad according to the related art taken along II–II' of FIG. 1 after a transparent conductive film has been deposited. In FIG. 4B, a transparent conductive film 8a is formed to electrically interconnect the gate pad Gp1 with the driving circuit (not shown). However, the transparent conductive film 8a may not electrically interconnect the gate pad Gp1 to the driving circuit due to excessive etching of the gate insulating film 4. Arrows of FIG. 4B represent portions of the transparent conductive film 8a that may fail to interconnect the gate pad Gp1 with the driving circuit.

FIG. 5 is a scanning electron microscope (SEM) photograph of a gate pad according to the related art taken along II–II' of FIG. 1. In FIG. 5, the $SiN_x$ of the gate insulating film 4 is significantly overetched.

SUMMARY OF THE INVENTION

Accordingly, the present invention is directed to an LCD device and a method of manufacturing an LCD device that substantially obviates one or more problems due to limitations and disadvantages of the related art.

An object of the present invention is to provide an LCD device and a method of manufacturing an LCD device in which stable electrical connection between gate pads and a driving circuit is achieved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, a liquid crystal display device includes a first substrate, a second substrate opposed to the first substrate, a plurality of gate lines formed on the first substrate along a first direction, a plurality of data lines formed on the first substrate along a second direction perpendicular to the first direction to define a plurality of pixel regions at intersections of the gate and data lines, a plurality of gate pads, each of the gate pads formed at an end portion of a corresponding one of the plurality of gate lines, a plurality of data pads, each of the data pads formed at an end portion of a corresponding one of the plurality of data lines, a gate insulating film having a first density formed on an entire surface of the first substrate including the plurality of gate lines and the plurality of gate pads, a plurality of thin film transistors formed at each intersection of the gate and data lines and between respective gate lines and respective data lines, and a passivation film having a second density less than the first density formed on an entire surface of the first substrate including the plurality of thin film transistors, the plurality of data lines, and the plurality of data pads.

In another aspect, a liquid crystal display device includes a first substrate, a second substrate opposed to the first substrate, a plurality of gate lines formed on the first substrate along a first direction, a plurality of data lines formed on the first substrate along a second direction perpendicular to the first direction to define a plurality of pixel regions at intersections of the gate and data lines, a plurality of gate pads, each of the gate pads formed at an end portion of a corresponding one of the plurality of gate lines, a plurality of data pads, each of the data pads formed at an end portion of a corresponding one of the plurality of data lines, a gate insulating film having a first density formed on an entire surface of the first substrate including the plurality of gate lines and the plurality of gate pads, a plurality of thin film transistors formed at each intersection of the gate and data lines and between respective gate lines and respective data lines, a passivation film having a second density less than the first density formed on an entire surface of the first substrate including the plurality of thin film transistors, the plurality of data lines, and the plurality of data pad, a plurality of pixel electrodes formed on the first substrate, each pixel electrode formed within one of the plurality of pixel regions, a light-shielding layer formed on the second substrate, a color filter layer formed on the second substrate to oppose the plurality of pixel electrodes, a common electrode formed on the color filter layer over an entire surface of the second substrate and a liquid crystal layer formed between the first and second substrates.

In another aspect, a method of manufacturing a liquid crystal display device includes steps of forming a plurality of gate lines and a plurality of gate pads on a first substrate, forming a gate insulating film having a first density on an entire surface of the first substrate including the plurality of gate pads, forming a plurality of data lines and a plurality of data pads on the gate insulating film, forming a passivation film on an entire surface of the first substrate including the plurality of data pads, the passivation film having a second density less than the first density of the gate insulating film, etching portions of the gate insulating film and the passivation film on the plurality of gate pads to form a plurality of contact holes, each contact hole corresponds to one of each of the plurality of gate pads, and forming a transparent conductive film electrically connected to the gate pads through the contact holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 6B is a cross sectional view of an exemplary gate pad on the first substrate according to the present invention taken along II–II' of FIG. 6A;

FIG. 7A is an SEM photograph of the exemplary gate pad on the first substrate according to the present invention taken along II–II' of FIG. 6A;

FIG. 7B is an SEM photograph of another exemplary gate pad on the first substrate according to the present invention taken along II–II' of FIG. 6A.

DETAILED DESCRIPTION OF THE INVENTION

Reference will now be made in detail to the preferred embodiments of the present invention, examples of which are illustrated in the accompanying drawings.

Figure 1:
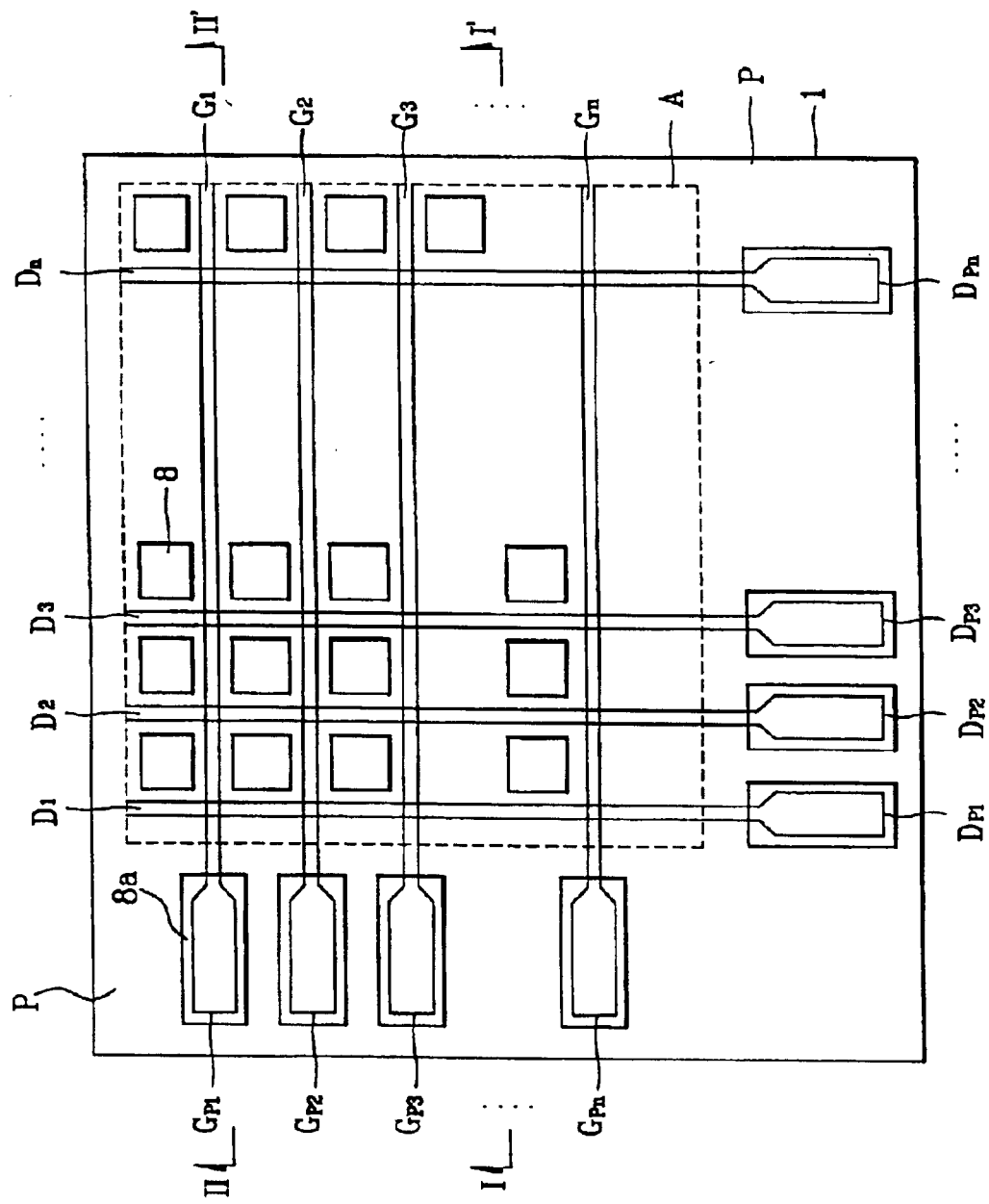
FIG. 1 is a plan view of a first substrate of an LCD device according to the related art.
Figure 2:
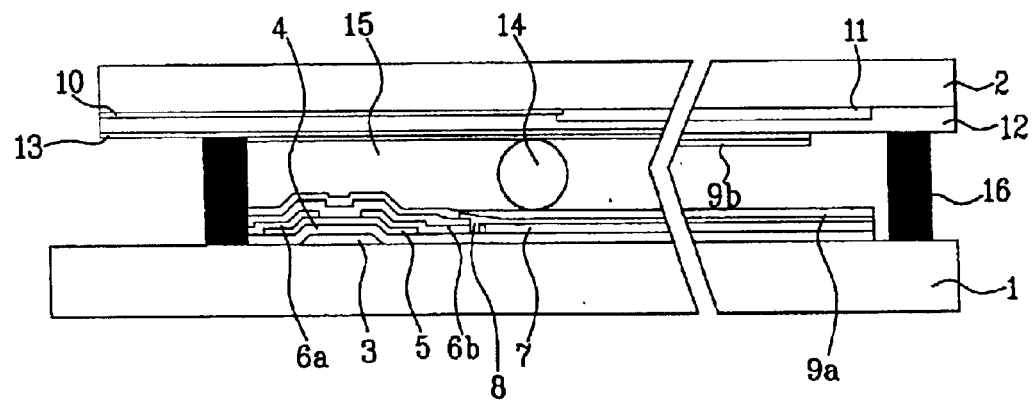
FIG. 2 is a cross sectional view of the LCD device according to the related art taken along I–I' of FIG. 1.
Figure 3:
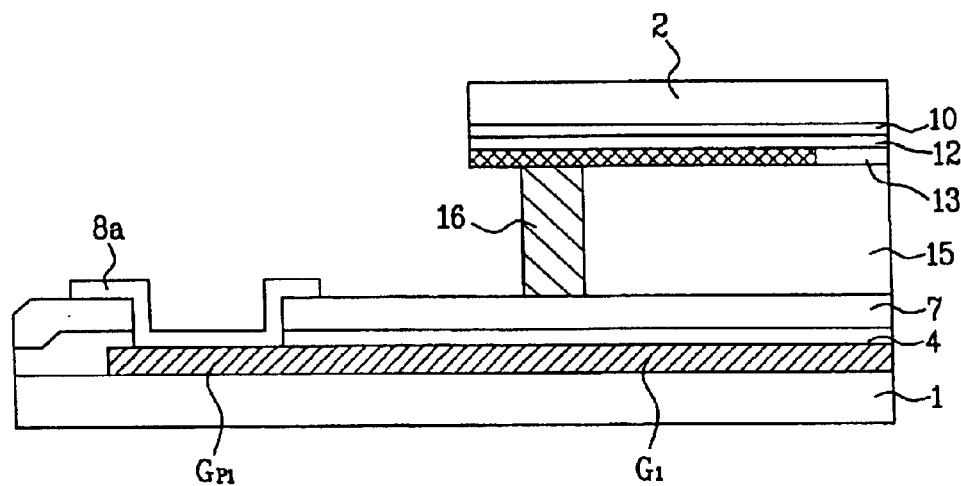
FIG. 3 is a cross sectional view of the LCD device according to the related art taken along II–II' of FIG. 1.
Figure 4A:
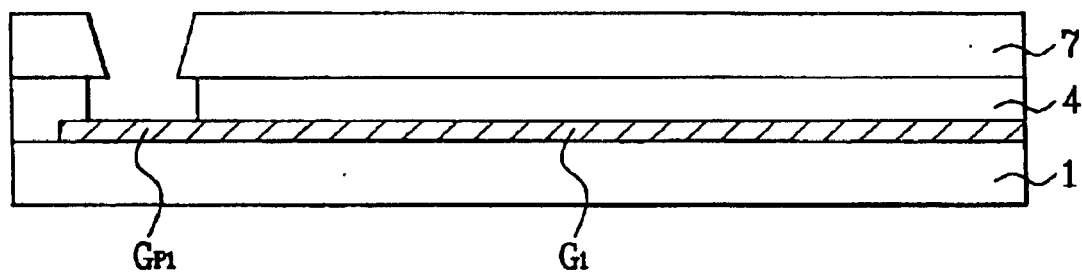
FIG. 4A is a cross sectional view of a gate pad according to the related art taken along II–II' of FIG. 1 after a gate insulating film and a passivation film are etched.
Figure 4B:
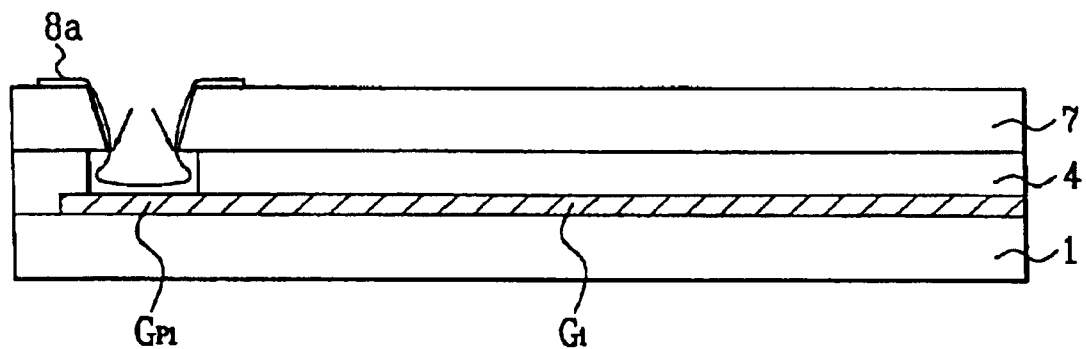
FIG. 4B is a cross sectional view of a gate pad according to the related art taken along II–II' of FIG. 1 after a transparent conductive film has been deposited.
Figure 5:
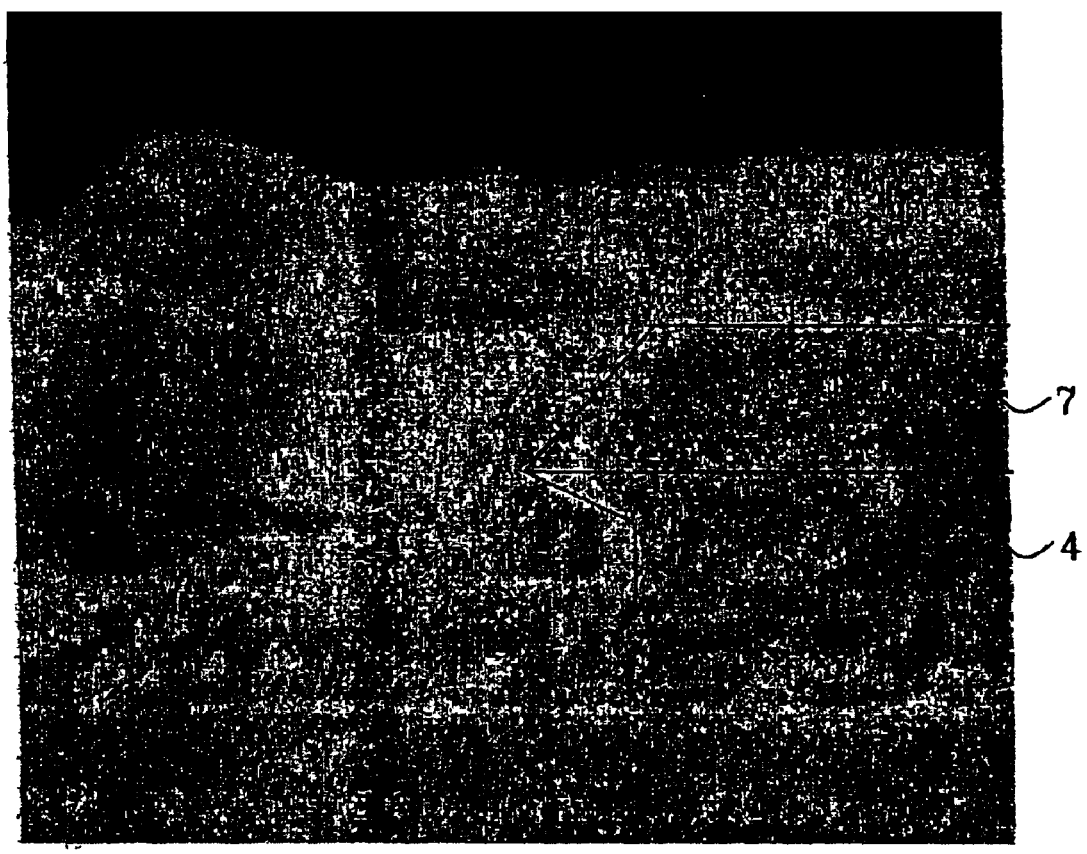
FIG. 5 is a scanning electron microscope (SEM) photograph of a gate pad according to the related art taken along II–II' of FIG. 1.
Figure 6A:
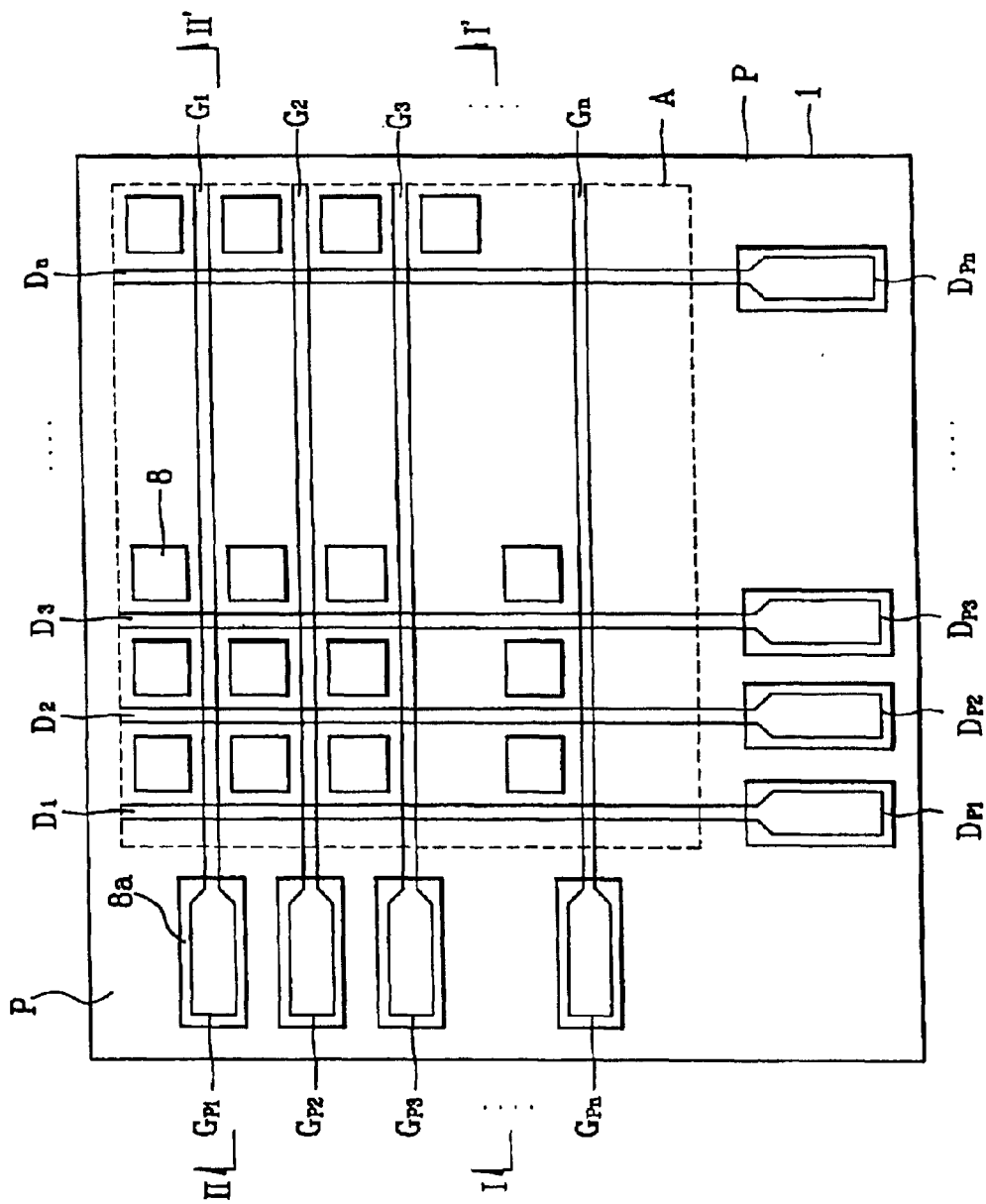
FIG. 6A is a plan view of an exemplary first substrate of an LCD device according to the present invention.

FIG. 6A is a plan view of an exemplary first substrate of an LCD device according to the present invention, and FIG. 6B is a cross sectional view of an exemplary gate pad on the first substrate according to the present invention taken along II–II' of FIG. 6A.

In FIG. 6A, an LCD device may include a first substrate 1 divided into an active region A and a pad region P. Within the active region A, a plurality of gate lines $G_1, G_2, \ldots, G_n$ may be arranged to cross a plurality of data lines $D_1, D_2, \ldots, D_n$ so that a plurality of pixel regions may be defined. A pixel electrode 8 may be formed within each pixel region, and a thin film transistor (TFT) (not shown) may be formed at each crossing point between the respective gate and data lines. Within the pad region P, a plurality of gate pads $G_{p1}, G_{p2}, \ldots, G_{pn}$ and a plurality of data pads $D_{p1}, D_{p2}, \ldots, D_{pn}$ may be arranged. The gate pads $G_{p1}, G_{p2}, \ldots, G_{pn}$ may transmit gate signals output from a gate driving IC (not shown) to the gate lines $G_1, G_2, \ldots, G_n$. The data pads $D_{p1}, D_{p2}, \ldots, D_{pn}$ may transmit data signals output from a data driving IC (not shown) to the data lines $D_1, D_2, \ldots, D_n$.

In FIG. 6B, the first substrate 1 may include a gate line G1, a gate insulating film 4, a passivation film 7, and a transparent conductive film 8a. The gate insulating film 4 may be formed to cover the gate line G1 and a surface of the first substrate 1, and the passivation film 7 may be formed to cover the gate insulating film 4. The transparent conductive film 8a may be formed to electrically interconnect the gate line G1 to a control circuit (not shown) via a gate pad Gp1. The transparent conductive film 8a may be formed along coplanar, inclined sidewall portions of the gate insulating film 4 and the passivation film 7.

The gate insulating film 4 and the passivation film 7 may be formed by a plasma CVD process, for example, using a mixed gas of $SiH_4$ and $NH_3$. A first amount of $SiH_4$ contained in the mixed gas when the gate insulating film 4 is formed may be greater than a second amount of $SiH_4$ contained in the mixed gas when the passivation film 7 is formed. Accordingly, a density of the gate insulating film 4 may be greater than a density of the passivation film 7.

FIG. 7A is an SEM photograph of the exemplary gate pad on the first substrate according to the present invention taken along II–II' of FIG. 6A. In FIG. 7A, inclined sidewall portions of the gate insulating film 4 are shown to have a first slope and inclined sidewall portions of the passivation film 7 are shown to have a second slope. As a result of the different first and second amounts of $SiH_4$ contained in the mixed gas during formation of the gate insulating film 4 and the passivation film 7, etching characteristics of the gate insulating film 7 are significantly different than etching characteristics of the passivation film 7. Accordingly, after etching the gate insulating film 4 and the passivation film 7 to form a contact hole to expose the gate pad, the first slope of the inclined sidewall portions of the gate insulating film 4 is larger than the second slope of the passivation film 7. Thus, step coverage of subsequently formed transparent conductive material in the contact hole formed through the gate insulating film 4 and the passivation film 7 is improved over the related art.

FIG. 7B is an SEM photograph of another exemplary gate pad on the first substrate according to the present invention taken along II–II' of FIG. 6A. In FIG. 7B, inclined sidewall portions of the gate insulating film 4 and the passivation film 7 are shown to have a similar slope. As a result of maintaining a constant amount of $SiH_4$ contained in the mixed gas during formation of the gate insulating film 4 and the passivation film 7, etching characteristics of the gate insulating film 7 are similar to etching characteristics of the passivation film 7. Accordingly, after etching the gate insulating film 4 and the passivation film 7 to form a contact hole to expose the gate pad, the inclined sidewall portions of the gate insulating film 4 and the passivation film 7 may be coplanar. Thus, step coverage of subsequently formed transparent conductive material in the contact hole formed through the gate insulating film 4 and the passivation film 7 is improved over the related art.

Alternatively, two gate insulating films (lower and upper gate insulating films) may be formed in the LCD device according to the present invention. Accordingly, a density of the lower gate insulating film may be greater than a density of the upper gate insulating film. Moreover, two passivation films (lower and upper passivation films) may be formed in the LCD device according to the present invention. Accordingly, a density of the lower passivation film may be greater than a density of the upper passivation film. Further, principles of the present invention may be adapted to contact holes through which a transparent conductive film connects a pixel electrode with a TFT or a contact hole through which a transparent conductive film connects a data driving circuit with a data pad. Accordingly, the contact holes may have a plurality of inclined sidewall portions.

FIGS. 8A to 8E are cross sectional views of an exemplary process of manufacturing a gate pad of the LCD device according to the present invention, taken along II–II' of FIG. 6A.

Figure 8A:
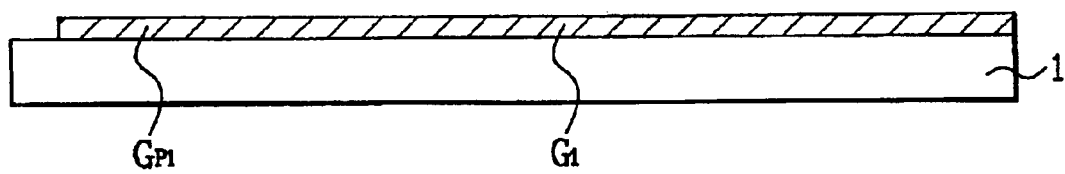
FIGS. 8A to 8E are cross sectional views of an exemplary process of manufacturing the exemplary gate pad of the LCD device according to the present invention, taken along line II–II' of FIG. 6A.

In FIG. 8A, a gate line G1 may formed along an upper surface of a substrate 1 to include a gate pad Gp1. The gate line G1 may extend from an active region (A in FIG. 6A) to a pad region (P in FIG. 6A). The gate pad Gp1 may be formed within the pad region (P in FIG. 6A).

Figure 8B:
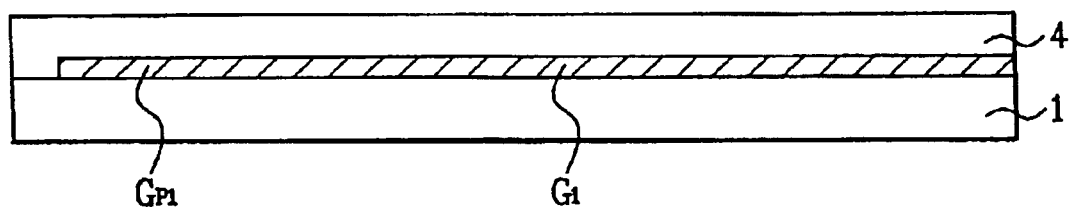

In FIG. 8B, a gate insulating film 4 may be formed on an entire surface of the first substrate 1 within the active region (A in FIG. 6A) and the pad region (P in FIG. 6A), and cover the gate pad Gp1. Alternatively, two gate insulating films (lower and upper gate insulating films) may be formed on the substrate 1, the gate line G1, and the gate pad Gp1. Accordingly, a density of the lower gate insulating film may be greater than that of the upper gate insulating film. Thus, inclined sidewall portions of the lower gate insulating film may have a greater slope than inclined sidewall portions of the upper gate insulating film. In addition, the gate insulating film 4 may be formed to cover data lines (not shown) and data pads (not shown) formed within the active region A.

Figure 8C:
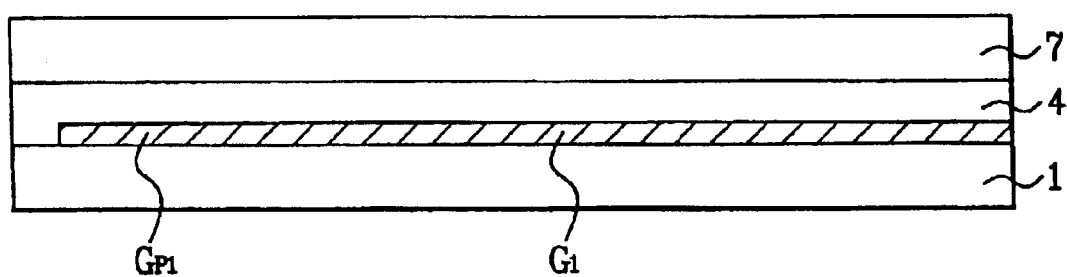

In FIG. 8C, a passivation film 7 may formed on the gate insulating film 4 and an entire surface of the substrate 1 including the data lines (not shown) and the data pads (not shown). Accordingly, a density of the passivation film 7 may be less than a density of the gate insulating film 4. Alternatively, two passivation films (lower and upper passivation films) may be formed on the gate insulating film 4 and an entire surface of the substrate 1. Accordingly, a density of the lower passivation film may be greater than a density of the upper passivation film, but smaller than a density of the gate insulating film, including an upper gate insulating film of a two gate insulating film structure.

Figure 8D:
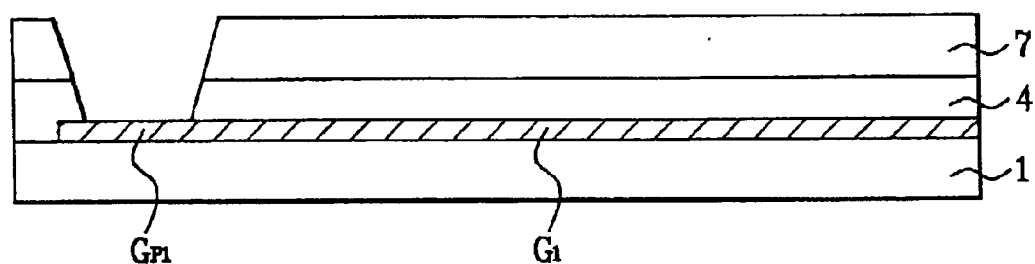

In FIG. 8D, a contact hole may be formed to pass through the passivation film 7 and the gate insulating film 4. The contact hole may be formed by an etching process, for example.

Figure 8E:
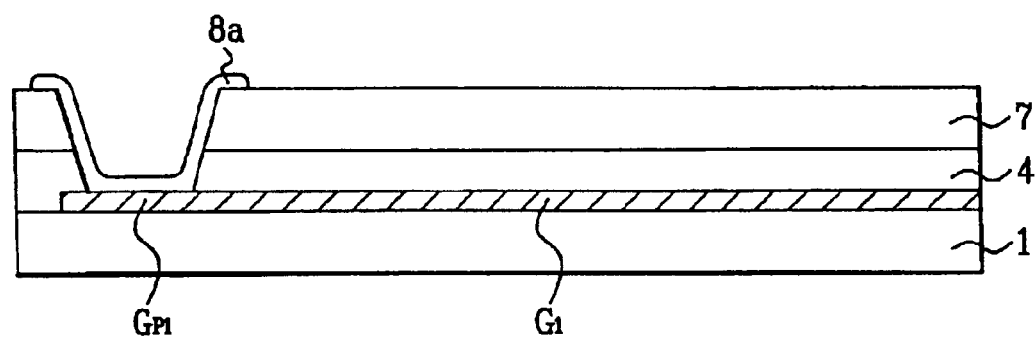

In FIG. 8E, a transparent conductive film 8a of indium tin oxide (ITO), for example, may be formed to electrically interconnect the gate line G1 to a driving circuit (not shown) via the gate pad Gp1. Finally, although not shown, the transparent conductive film 8a formed on the gate pad may be electrically connected with the driving circuit by a tape carrier package (TCP).

It will be apparent to those skilled in the art that various modifications and variations can be made in liquid crystal display device and method of manufacturing an LCD device according to the present invention. Thus, it is intended that the present invention covers the modifications and variations of this invention provided they come within the scope of the appended claims and their equivalents.

What is claimed is:

1. A liquid crystal display device, comprising:
   a first substrate;
   a second substrate opposed to the first substrate;
   a plurality of gate lines formed on the first substrate along a first direction;
   a plurality of data lines formed on the first substrate along a second direction perpendicular to the first direction to define a plurality of pixel regions at intersections of the gate and data lines;
   a plurality of gate pads, each of the gate pads formed at an end portion of a corresponding one of the plurality of gate lines;
   a plurality of data pads, each of the data pads formed at an end portion of a corresponding one of the plurality of data lines;
   a gate insulating film having a first density formed on an entire surface of the first substrate including the plurality of gate lines and the plurality of gate pads;
   a plurality of thin film transistors formed at each intersection of the gate and data lines and between respective gate lines and respective data lines; and
   a passivation film having a second density less than the first density formed on an entire surface of the first substrate including the plurality of thin film transistors, the plurality of data lines, and the plurality of data pads.

2. The device according to claim 1, wherein the gate insulating film and the passivation film are each formed of a first material including $SiN_x$.

3. The device according to claim 1, wherein the gate insulating film includes a lower gate insulating layer having a third density and an upper gate insulating layer having a fourth density lower than the third density.

4. The device according to claim 3, wherein the passivation film includes a lower passivation layer having a fifth density and an upper passivation layer having a sixth density lower than the fifth density, and the fifth density is lower than the fourth density of the upper gate insulating layer.

5. The device according to claim 1, wherein the passivation film includes a lower layer having a fifth density and an upper layer having a sixth density, wherein the fifth density is greater than the sixth density.

6. A liquid crystal display device, comprising:
   a first substrate;
   a second substrate opposed to the first substrate;
   a plurality of gate lines formed on the first substrate along a first direction;
   a plurality of data lines formed on the first substrate along a second direction perpendicular to the first direction to define a plurality of pixel regions at intersections of the gate and data lines;
   a plurality of gate pads, each of the gate pads formed at an end portion of a corresponding one of the plurality of gate lines;
   a plurality of data pads, each of the data pads formed at an end portion of a corresponding one of the plurality of data lines;
   a gate insulating film having a first density formed on an entire surface of the first substrate including the plurality of gate lines and the plurality of gate pads;
   a plurality of thin film transistors formed at each intersection of the gate and data lines and between respective gate lines and respective data lines;
   a passivation film having a second density less than the first density formed on an entire surface of the first substrate including the plurality of thin film transistors, the plurality of data lines, and the plurality of data pad;
   a plurality of pixel electrodes formed on the first substrate, each pixel electrode formed within one of the plurality of pixel regions;
   a light-shielding layer formed on the second substrate;
   a color filter layer formed on the second substrate to oppose the plurality of pixel electrodes;
   a common electrode formed on the color filter layer over an entire surface of the second substrate; and
   a liquid crystal layer formed between the first and second substrates.

7. The device according to claim 6, wherein the gate insulating film and the passivation film are each formed of a first material including $SiN_x$.

8. The device according to claim 6, wherein the gate insulating film includes a lower gate insulating layer having a third density and an upper gate insulating layer having a fourth density lower than the third density.

9. The device according to claim 8, wherein the passivation film includes a lower passivation layer having a fifth density and an upper passivation layer having a sixth density lower than the fifth density, and the fifth density is lower than the fourth density of the upper gate insulating layer.

10. The device according to claim 6, wherein the passivation film includes a lower layer having a fifth density and an upper layer having a sixth density lower than the fifth density.

11. A method of manufacturing a liquid crystal display device, comprising steps of:
    forming a plurality of gate lines and a plurality of gate pads on a first substrate;
    forming a gate insulating film having a first density on an entire surface of the first substrate including the plurality of gate pads;
    forming a plurality of data lines and a plurality of data pads on the gate insulating film;
    forming a passivation film on an entire surface of the first substrate including the plurality of data pads, the passivation film having a second density less than the first density of the gate insulating film;
    etching portions of the gate insulating film and the passivation film on the plurality of gate pads to form a plurality of contact holes, each contact hole corresponds to one of each of the plurality of gate pads; and
    forming a transparent conductive film electrically connected to the gate pads through the contact holes.

12. The method according to claim 11, wherein the step of forming a gate insulating film and the step of forming a passivation film include depositing $SiN_x$ by a plasma chemical vapor deposition process using a mixed gas of $SiH_4$ and $NH_3$.

13. The method according to claim 12, wherein the step of forming a gate insulating film includes the mixed gas having a first ratio of $SiH_4$ to $NH_3$, and the step of forming a passivation film includes the mixed gas having a second ratio of $SiH_4$ to $NH_3$ different than the first ratio.

14. The method according to claim 13, wherein the first ratio is greater than the second ratio.

15. The method according to claim 11, wherein the step of forming a gate insulating film includes a first step of forming a lower gate insulating film having a third density and a second step of forming an upper gate insulating film having a fourth density less than the third density.

16. The method according to claim 15, wherein the first density of the gate insulating film is an average of the third and fourth densities.

17. The method according to claim 11, wherein the step of forming a passivation film includes a first step of forming a lower passivation film having a third density and a second step of forming an upper passivation film having a fourth density less than the third density.

18. The method according to claim 17, wherein the second density of the passivation film is an average of the third and fourth densities.

* * * * *